Figure 1:
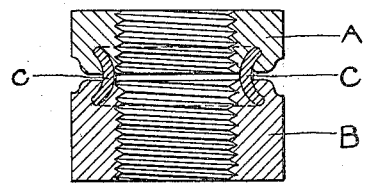

H. T. HUTTON.
LOCK NUT.
APPLICATION FILED MAR. 1, 1922.

1,436,805.                    Patented Nov. 28, 1922.

Inventor
Henry Thomas Hutton
per Small & Small
Attorneys.

Patented Nov. 28, 1922.

1,436,805

UNITED STATES PATENT OFFICE.

HENRY THOMAS HUTTON, OF DONAGHADEE, IRELAND.

LOCK NUT.

Application filed March 1, 1922. Serial No. 540,253.

*To all whom it may concern:*

Be it known that I, HENRY THOMAS HUTTON, a British subject, residing at Erin Lodge, Donaghadee, county Down, Ireland, have invented certain new and useful Improvements in Lock Nuts, of which the following is a specification.

This invention has reference to improvements in locknuts of the type consisting of two separate nuts held together by a ring which is engaged in annular recesses or grooves formed in the adjacent ends of the nuts. Two constructional forms of such nuts are known: In one case the friction between the ring and the nuts is utilized to oppose relative rotation of the nuts around their common axis and to hold the two nuts together, the grooves being concentric with the tap hole and having straight or converging sides so that, but for the said friction, the assembled nut could be readily pulled apart; and in the other case the grooves are formed eccentrically to the tap hole so that relative rotation of the two parts of the nut on a bolt is also opposed by a cam like action of the part of the nut moved, such part being pressed or wedged into the thread of the bolt at one side thereof.

Experiments made by me show that the most effective locking action is obtained by causing the nuts to grip the bolt tightly all around its periphery and I have devised a construction of nut of the kind in question which meets perfectly this requirement and also the requirements that the two parts of the nut shall remain in permanent engagement with each other and may be used over and over again.

The characteristic features of my improved locknut are that (1) the two nuts are coupled permanently together, but so that they can be rotated relatively to each other, by forming the annular recesses or grooves of gradually increasing diameter and forcing a cylindrical metal ring into the said recesses or grooves so that the end portions of the ring are caused to expand and become flared, and (2) the depth of the recesses or grooves and the dimensions of the ring are so proportioned that the ends of the ring bed in the bottoms of the said recesses or grooves before the nuts come into close contact with each other, so that when the assembled locknut as a whole has been screwed up tight on a bolt and the outer nut is then rotated a little further to cause it to approach the other nut the inner wall of the groove or recess in each nut is caused to bind circumferentially upon the bolt all around its periphery by the action of the bedded ring under the pressure exerted endwise upon it during the said further rotation of the outer nut.

Figure 2:
Figure 3:
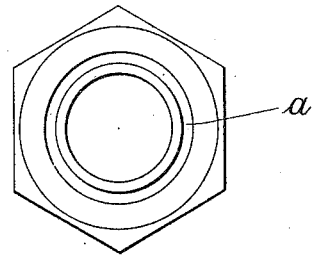
Figure 4:
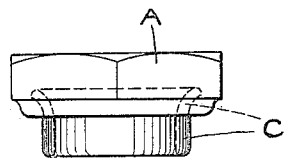

I have illustrated an embodiment of my invention in the accompanying drawing, in which:

Fig. 1 is a longitudinal section of a locknut constructed in accordance with my invention; and Figs. 2, 3 and 4 show details hereinafter referred to.

In the said drawing, A is the outer or locking nut, and B the nut to be locked. Each of these nuts has an annular recess or groove $a$ (Fig. 3) of gradually increasing diameter formed in one end of it concentric with the tap hole and preferably before the nuts are tapped. C is an expansible cylindrical ring, formed for example of mild steel, adapted to be forced into the recesses or grooves $a$ and to bed in the bottoms of these recesses or grooves before the two parts of the nut contact with each other. Fig. 2 shows the said ring, in section, before it is forced into the said grooves, and Fig. 4 shows it after it has been forced into the groove $a$ in the nut A, the expanded portion of the ring being indicated in dotted lines.

When the twin nuts have been assembled, and tapped, as seen in Fig. 1, the complete locknut is manipulated like an ordinary nut in screwing it on to a bolt, both nuts being rotated in unison until the inner nut is screwed up tight. Thereupon the outer or locking part A of the nut is rotated a little further to effect the locking. This further rotation tends to compress the ring C endwise but as it is in contact with the bottoms of the grooves $a$ it can only yield by bending and pressing inwards the inner walls of the grooves, which are comparatively thin, and this causes both nuts to grip the bolt tightly on its whole periphery, the grip being of a somewhat elastic nature so that when the outer nut has been turned backwards into its original position in relation to the inner nut the complete nut can be readily rotated backwards to remove it from the bolt. It is unnecessary to use a second wrench to prevent the inner nut from turning and being unduly tightened when the outer nut is being rotated relatively thereto in the locking movement, as the two nuts do not bind upon each other; indeed, they need not come into actual contact.

What I claim is:—

In a locknut consisting of two separate nuts coupled together by a ring which is engaged in annular grooves formed in the adjacent ends of the nuts concentric with the tap hole, forming the said grooves of gradually increasing diameter, so that the inner wall of the groove is inclined at an angle to the axis of the tap hole, and forcing a cylindrical ring into the said grooves so that the end portions of the ring are caused to expand and become flared, the depth of the grooves and the dimensions of the rings being so proportioned that the ends of the ring bed in the bottoms of the grooves before the nuts come into contact with each other.

In testimony whereof I have affixed my signature.

HENRY THOMAS HUTTON.